July 15, 1958  H. GANGER  2,842,889
SINKER
Filed Jan. 8, 1957
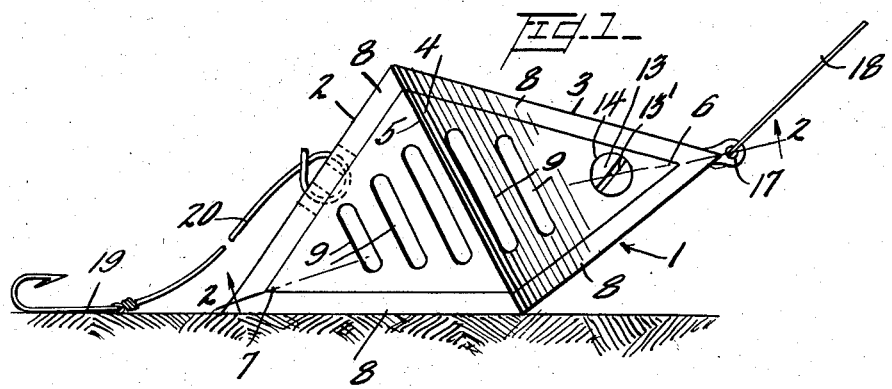
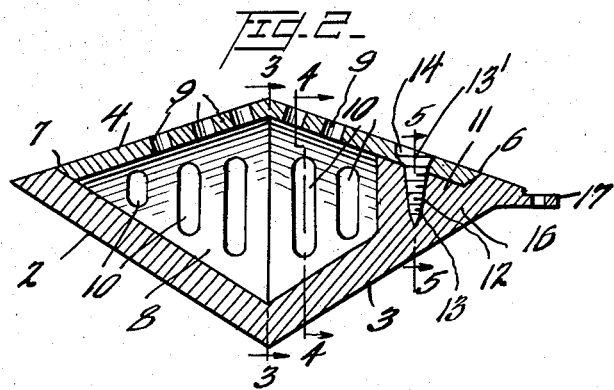
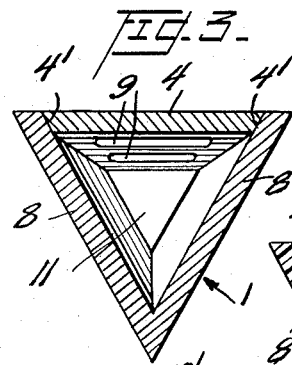
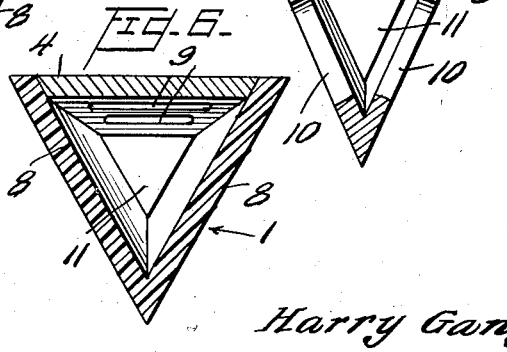
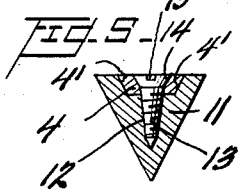
INVENTOR
Harry Ganger,
BY Parker Cook
ATTORNEY

United States Patent Office 2,842,889
Patented July 15, 1958

2,842,889

SINKER

Harry Ganger, Atlantic City, N. J.

Application January 8, 1957, Serial No. 633,004

1 Claim. (Cl. 43—44.99)

My invention relates to a new and useful improvement in a sinker, or, as popularly known along the Jersey coast, a "dipsy." The structure disclosed in the present application is somewhat similar in form to the structure disclosed in the patent granted to me on December 18, 1956, No. 2,774,174, for a "Sinker."

In the patent abovementioned there was shown and described a hollow right triangular pyramidal sinker with a removable cover plate forming the base which was to be fastened in place after the chum was inserted in the sinker.

The present application calls for a sinker of hexahedron shape, the similarity to the structure in the abovementioned patent being that it is hollow, has orifices in the walls, and a plate to cover an open face; but it varies from the structure shown in the abovementioned patent from this point on, in that it consists of a unitary structure (not counting the cover plate) having two portions in the shape of right triangular pyramids with contiguous bases so that if the rear half of the sinker is lying in a horizontal plane on the bottom of the ocean, the forward part of the sinker will extend at an upward inclined angle.

To understand the advantages, it may be necessary to consider the fishing conditions especially along the Jersey coast.

In the back bays and thoroughfares there is a plant, known as "sea lettuce" or, technically, *Ulva latissima*, that grows in great profusion. During a storm (generally a "northeaster") or during a high tide, during the new moon and a full moon, this "sea lettuce" is broken away and washes through the inlets into the ocean; and at times, that is during the storm or right after the storm, it is impossible to fish because this "sea lettuce" gets on the line, works down to the sinker, and makes it impossible to reel in.

However, after a day or two this "sea lettuce" settles to the bottom. Then when fishing in the surf with an ordinary pyramidal sinker, where the line is connected to an eyelet in the base, as the line is reeled in, the sinker dragging along the bottom picks up the "sea lettuce" and often puts such a mass just above the sinker that it is nearly impossible to reel in the line, and oftentimes if one is using a No. 6 or a No. 9 line, the whole rig will be lost.

One of the objects of the present invention therefore is to provide a sinker wherein the forward portion will extend at an inclined upward angle to the horizontal so that as the line is reeled in it will tend to "skid" over the "sea lettuce" rather than collecting it. Furthermore, any "sea lettuce" contacting with the apex of the sinker is likely to be washed from the sinker rather than collecting like it does with the conventional pyramidal sinker.

Another object of the invention is to provide a hollow sinker with an open face, consisting of the body portion and a removable plate, and means for holding the plate in position so that in reality it is a hexahedron with two right triangular pyramids having their bases contiguous.

Referring now to the drawings, showing a preferred embodiment and one modification, Fig. 1 is a view in elevation of my improved sinker, Fig. 2 is a sectional view taken on line 2—2 of Fig. 1, Fig. 3 is a vertical section taken on line 3—3 of Fig. 2, Fig. 4 is a similar vertical view taken on line 4—4 of Fig. 2, Fig. 5 is a similar section taken on line 5—5 of Fig. 2, and Fig. 6 is a sectional view similar to Fig. 3 but showing a slight modification.

Referring now to Figs. 1 and 2 for the moment, it will be seen that the body portion 1 of this sinker consists of two hollow right triangular pyramids 2 and 3 with the bases contiguous although there is no dividing line between the two bases.

Also as shown in Figs. 1 and 2, there is provided a removable plate 4, which for the purpose of invention in the description and claim will be considered as the bottom of the sinker. As considered from Fig. 1, the bottom plate 4 slopes from the center line 5 downwardly to the forward end of the sinker as at 6 and slopes downwardly from the center line towards the rear end of the sinker as at 7.

Now the bottom plate 4 is provided with elongated slots 9, and the side walls 8 of the body 1 of the sinker are provided with similar elongated slots 10. The defining edges 4' of the plate 4 are bevelled or tapered so that when placed in position, as shown in Figs. 3 to 5 inclusive, the outer surface of this plate 4 will be flush with the upper edges of the walls 8 of the hexahedron sinker.

Glancing at Fig. 2 for the moment, it will be seen that I have built up the forward end 16 of the sinker as at 11, and in this built-up portion 11 I cast a tapered hole 12 so that a screw 13 may pass through an orifice 14 in the bottom plate 4 and thread itself into the hole 12 in the built-up portion 11.

The kerf 16 in the screw 13 is of such width that it will receive a ten-cent piece or "dime," so that all a fisherman has to do to fasten this plate 4 in position, is feed this screw 13 into the tapered hole 12 and tighten it with a ten-cent piece.

At the forward end of the sinker, as viewed from Fig. 1, there is cast an eyelet 17 to which the fishing line 18 may be connected.

The construction of the sinker is such that the bottom plate 4 may be removed and then the sinker filled with cut-up beach clams, or cut-up mullet, menhaden (moss bunkers), or any other chum that will form a slick, after which the bottom plate 4 is fastened in position, the thought being that the oil from the chum will attract the fish.

It might be mentioned also that the sinker, in the preferred form, is to be cast of aluminum, and as the drawing shows the actual size, it will weigh about two and a half ounces, but when packed with a chum it may be made to weigh between three and five ounces.

Ordinarily, a four-ounce sinker is sufficient, but if the tide is running strong, it may be necessary to use a five-ounce sinker to keep the sinker from washing on to the shore.

In Fig. 1, I have shown a hook 19 having the leader 20 as fastened through one of the slots or openings in the sinker, the thought being that if the slick floats rearwardly and the fish approach from the rear, they may bite on the bait (not shown) on the hook 19 before they nibble on any chum that might be protruding through the slots in the sinker.

In the preferred form as mentioned above I cast the sinker, that is, the body portion and the plate, of aluminum, as aluminum will not rust in salt water; and even though it may tarnish, it may be brightened with a piece of sandpaper.

However, in the modified form, as shown in Fig. 6, for the sake of economy I form the body portion of the sinker out of plastic, which may be of variegated colors and may attract the fish; and, to add sufficient weight to the sinker, I form the bottom plate of lead, which will weigh about two ounces, so that when the sinker is filled with chum, it will weigh from four to five ounces, depending upon how much chum is packed within the sinker.

From the foregoing it will be seen that I have formed a hollow polyhedron sinker, which is specifically in the shape of a hexahedron, so that when pulled along the bottom of the ocean it will have its forward end extending upwardly to thus slide over the "sea lettuce" rather than have the "sea lettuce" pile up against the base, as is the case with the conventional pyramidal sinker.

Lastly, the sinker has another advantage over the conventional pyramidal sinker in that it often happens that when fishing for rock fish (*Roccus lineatus*) it is desirable to cast near a rock jetty, and if the surf caster happens to throw the sinker into the jetty rather than alongside the jetty, the chances of freeing the sinker when reeling in with a pyramidal apex facing the surf caster are much greater that he will not lose the rig, but that it will slide over the rocks rather than becoming jammed, as with the conventional pyramidal sinker.

Having thus described my invention, what I claim is new and desire to secure by Letters Patent is:

A hollow sinker consisting of a body portion having an open face, a removable plate, means for holding the plate in a locked position over the open face, the sinker in the shape of a hexahedron, the six faces outlined by two right triangular pyramids having a contiguous base, and the body portion formed of plastic and the removable plate formed of lead.

References Cited in the file of this patent

UNITED STATES PATENTS

| | | |
|---|---|---|
| 717,681 | Hodge | Jan. 6, 1903 |
| 2,239,934 | Ruiz | Apr. 29, 1941 |
| 2,605,576 | Young | Aug. 5, 1952 |
| 2,774,174 | Ganger | Dec. 18, 1956 |

FOREIGN PATENTS

| | | |
|---|---|---|
| 981,788 | France | Jan. 17, 1951 |